(12) United States Patent
Van der Ploeg

(10) Patent No.: US 12,741,259 B2
(45) Date of Patent: Sep. 22, 2026

(54) ELECTRICALLY HEATED APPARATUS

(71) Applicant: SHELL USA, INC., Houston, TX (US)

(72) Inventor: Govert Gerardus Pieter Van der Ploeg, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 403 days.

(21) Appl. No.: 18/551,683

(22) PCT Filed: Apr. 13, 2022

(86) PCT No.: PCT/EP2022/059897

§ 371 (c)(1),
(2) Date: Sep. 21, 2023

(87) PCT Pub. No.: WO2022/219054

PCT Pub. Date: Oct. 10, 2022

(65) Prior Publication Data

US 2024/0157318 A1 May 16, 2024

(30) Foreign Application Priority Data

Apr. 15, 2021 (EP) .................................... 21168603

(51) Int. Cl.
*B01J 8/06* (2006.01)
*B01J 19/24* (2006.01)

(52) U.S. Cl.
CPC ............... *B01J 8/062* (2013.01); *B01J 8/067* (2013.01); *B01J 19/2415* (2013.01); *B01J 2219/00135* (2013.01); *B01J 2219/185* (2013.01)

(58) Field of Classification Search
CPC .............. B01J 8/062; B01J 2219/00135; B01J 2208/00415; F22B 21/40; C01B 3/34; C01B 3/342; F24H 1/205; C01G 9/20
See application file for complete search history.

(56) References Cited

U.S. PATENT DOCUMENTS 5,837,327 A 11/1998 Sue et al.
6,315,972 B1 11/2001 Mehdizadeh et al.
(Continued)

FOREIGN PATENT DOCUMENTS

CA 2469859 A1 11/2005
CN 202107542 U 1/2012
(Continued)

OTHER PUBLICATIONS

DE10144891 and translation (Year: 2003).*
(Continued)

*Primary Examiner* — Steven S Anderson, II
(74) *Attorney, Agent, or Firm* — SHELL USA, INC.

(57) ABSTRACT

The present invention provides an electrically heated apparatus (1), at least comprising: —an electrically heated furnace (2) having a roof (2A) and walls defining a space (3); —at least one tube (10) miming through the space (3), wherein the at least one tube (10) has an inlet (11) and an outlet (12) outside of the space (3); —electrical radiative heating elements (20) located in the space (3), which heating elements (20) can heat the at least one tube (10); wherein the heating elements (20) suspend from the roof (2A) of the space (3); and wherein the roof (2A) of the space (3) has a shape configured to have heating elements (20) suspending at different heights.

7 Claims, 3 Drawing Sheets

(56) References Cited

U.S. PATENT DOCUMENTS

Figure 1:
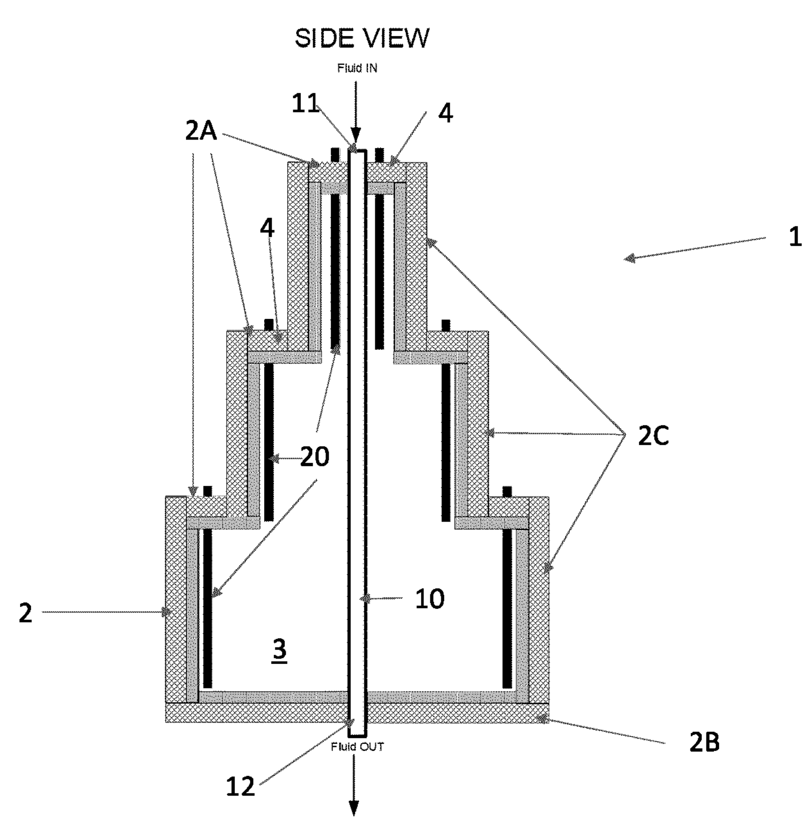

| | | | |
|---|---|---|---|
| 6,380,525 | B2 | 4/2002 | Dalton et al. |
| 6,740,303 | B2 | 5/2004 | Boneberg et al. |
| 6,878,471 | B1 | 4/2005 | Burch et al. |
| 7,025,875 | B2 | 4/2006 | Grieve et al. |
| 7,074,373 | B1 | 7/2006 | Warren et al. |
| 7,150,866 | B2 | 12/2006 | Wieland et al. |
| 7,160,342 | B2 | 1/2007 | Grieve et al. |
| 7,179,325 | B2 | 2/2007 | Oyama et al. |
| 7,867,301 | B2 | 1/2011 | Agnew et al. |
| 8,303,929 | B2 | 11/2012 | Peng et al. |
| 8,614,158 | B2 | 12/2013 | Leviness |
| 9,011,560 | B2 | 4/2015 | Simmons et al. |
| 9,126,831 | B2 | 9/2015 | Kale |
| 9,227,185 | B2 | 1/2016 | Mamedov |
| 9,266,731 | B2 | 2/2016 | Mass et al. |
| 9,295,961 | B2 | 3/2016 | Laska et al. |
| 9,440,851 | B2 | 9/2016 | Hwang |
| 9,725,385 | B2 | 8/2017 | Steynberg et al. |
| 10,132,566 | B2 | 11/2018 | Lee |
| 10,351,422 | B2 | 7/2019 | Machhammer et al. |
| 10,384,186 | B2 | 8/2019 | Egolf et al. |
| 10,589,257 | B2 | 3/2020 | Herskowitz et al. |
| 10,676,354 | B2 | 6/2020 | Finnerty et al. |
| 2002/0081253 | A1 | 6/2002 | Abe |
| 2002/0108306 | A1 | 8/2002 | Grieve et al. |
| 2003/0153632 | A1 | 8/2003 | Wang et al. |
| 2004/0083651 | A1 | 5/2004 | Kaufman et al. |
| 2004/0134127 | A1 * | 7/2004 | Pham ....................... B01J 8/062 422/204 |
| 2005/0223644 | A1 | 10/2005 | Kim |
| 2006/0124445 | A1 | 6/2006 | Labrecque et al. |
| 2006/0135631 | A1 | 6/2006 | Kopponen et al. |
| 2007/0049648 | A1 | 3/2007 | Shessel |
| 2007/0084116 | A1 | 4/2007 | Ringler et al. |
| 2007/0107308 | A1 | 5/2007 | Bonadies et al. |
| 2007/0131909 | A1 | 6/2007 | Rojey et al. |
| 2008/0044347 | A1 | 2/2008 | Roychoudhury et al. |
| 2008/0260628 | A1 | 10/2008 | Moon et al. |
| 2009/0199475 | A1 | 8/2009 | Devries et al. |
| 2010/0140552 | A1 | 6/2010 | Ammouri et al. |
| 2010/0186824 | A1 | 7/2010 | Bowe et al. |
| 2010/0242814 | A1 | 9/2010 | Jeney |
| 2010/0327231 | A1 | 12/2010 | Whitmore |
| 2011/0079016 | A1 | 4/2011 | Etemad et al. |
| 2012/0024843 | A1 | 2/2012 | Lissianski et al. |
| 2013/0058861 | A1 | 3/2013 | Idem et al. |
| 2013/0197288 | A1 | 8/2013 | Schafer et al. |
| 2013/0248768 | A1 | 9/2013 | Zachar |
| 2014/0079626 | A1 | 3/2014 | Ji et al. |
| 2014/0134101 | A1 | 5/2014 | Idem et al. |
| 2014/0369897 | A1 | 12/2014 | Verykios et al. |
| 2015/0047252 | A1 | 2/2015 | Goerz |
| 2015/0064096 | A1 | 3/2015 | Noyes et al. |
| 2015/0125771 | A1 | 5/2015 | Finnerty et al. |
| 2015/0308676 | A1 | 10/2015 | Lee et al. |
| 2015/0337224 | A1 | 11/2015 | Stiegman |
| 2016/0102259 | A1 | 4/2016 | Bool et al. |
| 2016/0115036 | A1 | 4/2016 | Yoo et al. |
| 2016/0177199 | A1 | 6/2016 | Amin et al. |
| 2016/0288074 | A1 | 10/2016 | Vogel et al. |
| 2016/0325990 | A1 * | 11/2016 | Galloway ................. C01B 3/34 |
| 2017/0106360 | A1 | 4/2017 | Meriam |
| 2017/0137284 | A1 | 5/2017 | Simmons et al. |
| 2018/0208466 | A1 | 7/2018 | Noyes et al. |
| 2021/0113980 | A1 | 4/2021 | Van Der Ploeg |
| 2022/0363537 | A1 | 11/2022 | Mortensen et al. |

FOREIGN PATENT DOCUMENTS

| | | | | |
|---|---|---|---|---|
| CN | 204128196 | U | 1/2015 | |
| CN | 204816461 | U | 12/2015 | |
| CN | 105754636 | A | 7/2016 | |
| CN | 205474153 | U | 8/2016 | |
| CN | 205635499 | U | 10/2016 | |
| CN | 209530497 | U | 10/2019 | |
| DE | 10144891 | A1 * | 3/2003 | ............. B01J 8/067 |
| DE | 102014112436 | A1 | 3/2016 | |
| EP | 0178795 | A2 | 4/1986 | |
| EP | 2520542 | A1 | 11/2012 | |
| FR | 2525122 | A1 | 10/1983 | |
| GB | 124760 | A | 6/1920 | |
| JP | S61119988 | A | 6/1986 | |
| JP | 2001198904 | A | 7/2001 | |
| JP | 2007000774 | A | 1/2007 | |
| JP | 2008230929 | A | 10/2008 | |
| JP | 2016153368 | A | 8/2016 | |
| JP | 6746528 | B2 | 8/2020 | |
| KR | 20060104718 | A | 10/2006 | |
| KR | 20110094800 | A | 8/2011 | |
| WO | 8911448 | A1 | 11/1989 | |
| WO | 2009011984 | A1 | 1/2009 | |
| WO | 2013135660 | A1 | 9/2013 | |
| WO | 2013135666 | A1 | 9/2013 | |
| WO | 2013135668 | A1 | 9/2013 | |
| WO | 2013135673 | A1 | 9/2013 | |
| WO | 2014064648 | A2 | 5/2014 | |
| WO | 2015189270 | A1 | 12/2015 | |
| WO | 2015195091 | A2 | 12/2015 | |
| WO | 2016022090 | A1 | 2/2016 | |

OTHER PUBLICATIONS

Office Action Received for Australian Application No. 2022257277, Mailed on Apr. 24, 2025, 04 Pages(04 Pages of Official Copy).

International Search Report and Written Opinion received for PCT Patent Application No. PCT/EP2022/059897, Mailed on Jul. 15, 2022, 10 pages.

Office Action Received for Chinese Application No. 201980040180.7, Mailed on Jan. 5, 2023, 15 Pages (8 Pages of English Translation and 7 Pages of Official Copy).

International Search Report and Written Opinion received for PCT Patent Application No. PCT/EP2019/066823, Mailed on Sep. 20, 2019, 9 pages.

Database WPI Week 201619, 1 page, XP002784612.

International Search Report and Written Opinion Received for PCT Patent Application No. PCT/EP2022/052971, Mailed on May 27, 2022, 11 Pages.

Office Action Received for Chinese Patent Application No. 202280027265.3, Mailed on Dec. 12, 2025, 12 Pages (06 Pages of English Translation and 06 Pages of Official Copy).

Office Action Received for Chinese Patent Application No. 202280010688.4, Mailed on Jul. 31, 2025, 15 Pages (07 Pages of English Translation and 08 Pages of Official Copy).

Office Action Received for Japanese Patent Application No. 2023-548324, Mailed on Mar. 16, 2026, 03 Pages.

* cited by examiner

ELECTRICALLY HEATED APPARATUS

CROSS REFERENCE TO RELATED APPLICATIONS

This is a National stage application of International Application No. PCT/EP2022/059897, filed 13 Apr. 2022, which claims priority of European Application No. 21168603.5 filed 15 Apr. 2021 which is incorporated herein by reference in its entirety.

The present invention relates to an electrically heated apparatus, in particular for performing gas conversion reactions or heating fluids at high temperatures and high thermal intensity.

Various electrically heated reactors are known in the art.

As an example, WO2020/002326A1 discloses a reactor configuration comprising at least one electrically heated furnace which defines a space, with at least one reactor tube placed in the furnace space. The reactor tube is heated using at least one electrical radiative heating element.

A problem associated with the above or other known electrical reactors is that in case of premature failure or aging of the electrical radiative heating elements, a shut-down of, or entry (by a person) into, the furnace space is often required. This can result in prolonged interruption of the furnace and the associated process, with related interruption in production. In particular for large scale units (>50 MW), for which the present invention is especially considered, this may result in very high costs due to lost production.

Another problem is that when use is made of brittle ceramic material in the heating elements, breakage could lead to a potential domino-effect (i.e. impacting other heating elements) when broken heating elements fall on lower placed heating elements. When use is made of certain metallic heating elements, a similar effect could happen, though this would concern molten metal falling on lower placed heating elements thereby causing electrical failure.

It is an object of the present invention to overcome or minimize one or more of the above or other problems.

It is a further object of the present invention to provide an alternative electrically heated apparatus, in particular one which is suitable for high temperature reactions (such as above 400° C.), heating fluids at high temperatures and for large scale (>50 MW) applications (using a multitude of tubes).

One or more of the above or other objects can be achieved by providing an electrically heated apparatus, at least comprising:

- an electrically heated furnace having a roof and walls defining a space;
- at least one tube running through the space, wherein the at least one tube has an inlet and an outlet outside of the space;
- electrical radiative heating elements located in the space, which heating elements can heat the at least one tube;
- wherein the heating elements suspend from the roof of the space; and
- wherein the roof of the space has a shape configured to have heating elements suspending at different heights.

It has surprisingly been found according to the present invention that the electrical radiative heating elements as used in the apparatus according to the present invention can be easily replaced in case of premature failure or aging of the electrical radiative heating elements, without the need for a shutdown of, or entry (by a person) into, the furnace space.

Further, the apparatus according to the present invention provides for a precise temperature control of the tubes and the fluids flowing through the tubes in an apparatus intended for large scale (>50 MW) applications (where a multitude of tubes is used). As a result, less unwanted by-products (such as coke formation) occur and longer operation times of the apparatus can be achieved.

Another advantage of the apparatus according to the present invention that by the placing of the heating elements at different heights, the heating elements can heat the tube over the full length of the tube. This, whilst the length of the tube is typically longer than the length of the separate heating elements.

A further advantage of the present invention is that the principle thereof can also be applied to existing apparatuses, by making the appropriate adaptions.

The person skilled in the art will readily understand that the electrically heated apparatus can vary widely and may comprise several additional elements. As the person skilled in the art is familiar with how to design an electrically heated apparatus, this is not discussed here in detail.

As mentioned above, the apparatus comprises an electrically heated furnace having a roof and walls defining a (furnace) space, together with the bottom. The walls, roof and bottom of this furnace typically comprise some refractory and insulation to avoid undue heat leakage to outside of the furnace. The electrically heated furnace may be provided with some non-electrical heating (other than provided as the result of an exothermic reaction), but preferably at least 50%, preferably at least 80%, most preferably all, of the heating is provided by electrical heating.

As mentioned above, the roof of the furnace space of the apparatus according to the present invention has a shape configured to have heating elements suspending at different heights. To this end, the roof may have a shape such that the roof is under an angle from the vertical, preferably using a stepped shape. According to a preferred embodiment of the apparatus according to the present invention, the roof has a shape selected from the group consisting of a gable shape, a stepped shape, a crow-stepped shape, preferably a crow-stepped shape. This allows the heating elements to suspend at different heights (and provide heat to different parts of the tube(s)). In this respect, the person skilled in the art will readily understand that not all heating elements need to suspend at a different height; in case e.g. rows of heating elements are used, then the heating elements in the same row will typically hang at the same height.

Further it is preferred that the heating elements are removably connected to the roof of the space in such a manner that the heating elements can be replaced via the roof, preferably by means of a closable opening in the roof. This allows for easy access to the heating elements and provides the possibility to replace a heating element in case of premature failure or aging even during operation of the apparatus. In case the heating elements are replaced during operation of the furnace, then the replacement preferably takes place in a pressure box to maintain the pressure in the furnace at the appropriate level (and to avoid that heat from within the furnace excessively exits the furnace).

The at least one tube (but typically several tubes) running through the space may be varied widely, provided that the tube have an inlet and outlet outside of the space. As a mere example, the tubes do not have to be straight (although preferred), but may have e.g. a S- or U-shape. In the event that U-shaped tubes are used, both the inlet and the outlet of the tubes may be at one side (e.g. at the top). If several tubes are present, then the tubes preferably run substantially parallel. In case the apparatus is in the form of a reactor (and hence not merely used for heating), the tubes can be referred to with 'reactor tubes'. The tubes may be in the form of a coil, i.e. spirally shaped.

The electrical radiative heating elements (located in the furnace space) are not particularly limited. Typically, for the heating of the electrical radiative heating elements, electric resistance heating is used (which makes use of the 'Joule effect'). Generally, the electrical radiative heating elements are suited to be heated to a temperature above 300° C. Preferably, the electrical radiative heating elements are suited to be heated to a temperature in the range of from 400 to 1600° C. Preferably, the electrical radiative heating elements comprise NiCr, SiC, $MoSi_2$ or FeCrAl based resistance heating elements.

The person skilled in the art will readily understand that the electrical radiative heating elements can take many different shapes such as rods, plates, sheets, grids, (e.g. ceramic) rods with heating wire wrapped around the rods, etc.

Typically, the length of the heating elements is smaller than the length of the tube(s). Hence, usually several separate heating elements are used to heat the tube(s) over the full length of the tube(s).

According to a preferred embodiment, the apparatus comprises at least ten tubes running through the space. Preferably, the tubes run substantially parallel.

Furthermore, it is preferred that the tube(s) extend in a substantially vertical manner. In such a vertical set-up of the tubes, it is preferred that the fluids flowing through the tubes flow downwards. Thus, in that case the inlet of the tubes is at the top and the outlet at the bottom.

To avoid undue overheating of the tubes it is preferred that the electrical radiative heating elements are not in direct contact with the tubes. In other words, the heating elements and the tubes do not touch each other, at least not in the furnace space.

Although the heating elements can have many forms, it is especially preferred that the electrical radiative heating elements are tubular heating elements, i.e. in the form of rods. Examples of suitable tubular heating elements are silicium carbide (SiC) rods, which are commercially available.

Such tubular SiC heating elements allow a compact design of the furnace space to be achieved.

In a further aspect, the present invention provides a method for performing a fluid conversion reaction or heating using the electrically heated apparatus according to the present invention, wherein the method comprises at least the steps of:

a) feeding a feed stream via the inlets of the tubes;
b) subjecting the feed stream flowing through the tubes to a fluid conversion reaction or heating in the space of the apparatus using heating as generated by the electrical radiative heating elements, thereby obtaining one or more reaction products or a heated feed stream;
c) removing the one or more reaction products or the heated feed stream from the apparatus via the outlets of the tubes.

Although not limited thereto, the method according to the present invention is in particular intended for heating or fluid conversion reactions in large scale applications (>50 MW).

The person skilled in the art will readily understand that the nature of the fluid conversion reaction is not particularly limited. Non-limiting, but preferred examples are SMR (Steam Methane Reforming), steam cracking, etc.

Figure 2:
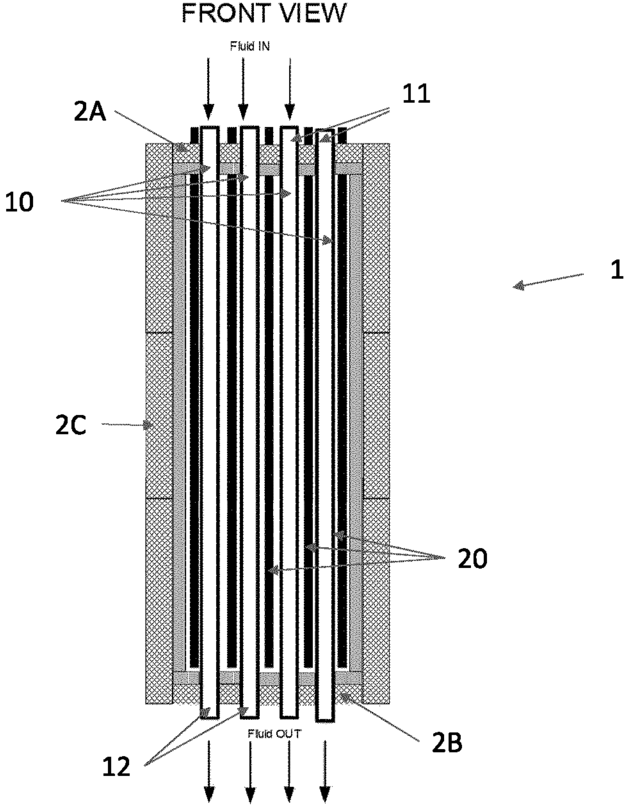
Figure 3:
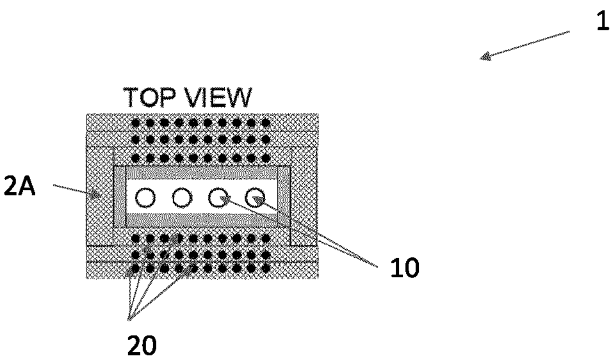

Hereinafter the present invention will be further illustrated by the following non-limiting drawings. Herein shows:

FIG. 1 schematically a cross-sectional side view of an apparatus according to the present invention having a crow-stepped gable shape;

FIG. 2 schematically a cross-sectional front view of the apparatus of FIG. 1; and FIG. 3 schematically a cross-sectional top view of the apparatus according to the present invention.

For the purpose of this description, same reference numbers refer to same or similar components.

In the embodiment of FIG. 1, the electrically heated apparatus of FIG. 1, generally referred to with reference number 1, is shown as a reactor. However, the person skilled in the art will readily understand that the apparatus can also be used for (only) heating fluids, i.e. without a reaction taking place.

The reactor 1 of FIG. 1 comprises: an electrically heated furnace 2 having a roof 2A, a bottom 2B and walls 2C defining a furnace space 3 therein; a multitude of reactor tubes 10 (only one being shown in FIG. 1) and a multitude of electrical radiative heating elements 20.

The electrical radiative heating elements 20 are located in the space 3 and suspend from the roof 2A. As the roof 2A of the space 3 has a crow-stepped gable shape, heating elements suspend at different heights (although heating elements in the same row will typically hang at the same height). The heating elements 20 are removably connected to the roof 2A of the furnace space 3; in the embodiment of FIG. 1 at closable openings 4 in the roof 2A.

As can be seen in FIG. 1, the reactor tubes 10 run through the space 3 and have an inlet 11 and outlet 12 outside of the space 3. Further, the reactor tubes 10 extend in a substantially vertical manner.

As can be further seen in FIG. 1, the electrical radiative heating elements 20 are not in direct contact with the reactor tubes 10.

The roof 2A, bottom 2B and walls 2C of the furnace space 2 are typically made from a heat-resistant and structural material and may be insulated to avoid undue leakage of heat from the inside of the furnace 2 to the outside thereof.

In the event of premature failing or aging of the electrical radiative heating elements 20 as used in the reactor 1 according to the present invention, these heating elements can be easily replaced (via the closable opening 4 in the roof 2A), without a shutdown of, or entry by a person into, the reactor 1 being required.

In case the heating elements 20 are replaced during operation of the reactor, then the replacement preferably takes place in a pressure box (not shown) to maintain the pressure in the furnace space 3 at the appropriate level (and to avoid that heat from within the furnace space 3 excessively exits the reactor).

As can be seen in the front view of FIG. 2, the reactor 1 contains a row of four parallel tubes 10.

As can be clearly seen from the top view of FIG. 3, the heating elements 20 are all readily accessible from the roof 2A (having a crow-stepped gable shape) of the reactor 1.

During use of the reactor of FIGS. 1-3, a fluid stream (typically a gas) is fed via the inlets 11 of the reactor tubes 10. The fluid stream flowing through the reactor tubes 10 is then subjected to a fluid conversion reaction in (the reactor tubes 10 within) the space 3 of the reactor 1 using heating as generated by the electrical radiative heating elements 20, thereby obtaining one or more reaction products.

Subsequently, the one or more reaction products are removed from the reactor 1 via the outlets 12 of the reactor tubes 10.

The person skilled in the art will readily understand that many modifications may be made without departing from the scope of the invention.

I claim:

1. An electrically heated apparatus, at least comprising:

an electrically heated furnace having a roof and walls defining a space;

at least one tube running through the space, wherein the at least one tube has an inlet and an outlet outside of the space;

electrical radiative heating elements located in the space, which heating elements can heat the at least one tube; wherein the heating elements suspend from the roof of the space; and wherein the roof of the space has a shape configured to have heating elements suspending at different heights, wherein the roof has a shape selected from the group consisting of a gable shape, a stepped shape and a crow-stepped shape.

2. The apparatus according to claim 1, wherein the roof has a crow-stepped shape.

3. The apparatus according to claim 1, wherein the heating elements are removably connected to the roof of the space in such a manner that the heating elements can be replaced via the roof.

4. The apparatus according to claim 1, comprising at least ten tubes running through the space.

5. The apparatus according to claim 1, wherein the tube(s) extend in a substantially vertical manner.

6. The apparatus according to claim 1, wherein the heating elements are not in direct contact with the tube(s).

7. A method for performing a fluid conversion reaction or heating using the electrically heated apparatus according to claim 1, wherein the method comprises at least the steps of:

a) feeding a feed stream via the inlets of the tubes;

b) subjecting the feed stream flowing through the tubes to a fluid conversion reaction or heating in the space of the apparatus using heating as generated by the electrical radiative heating elements, thereby obtaining one or more reaction products or a heated feed stream;

c) removing the one or more reaction products or a heated feed stream from the apparatus via the outlets of the tubes.

* * * * *